United States Patent
Park et al.

(10) Patent No.: US 10,581,506 B2
(45) Date of Patent: Mar. 3, 2020

(54) METHOD WHEREBY TERMINAL MEASURES RRM IN WIRELESS COMMUNICATION SYSTEM, AND DEVICES FOR SUPPORTING SAME

(71) Applicant: LG ELECTRONICS INC., Seoul (KR)

(72) Inventors: Hanjun Park, Seoul (KR); Yunjung Yi, Seoul (KR); Kijun Kim, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/319,733

(22) PCT Filed: Jul. 21, 2017

(86) PCT No.: PCT/KR2017/007898
§ 371 (c)(1),
(2) Date: Jan. 22, 2019

(87) PCT Pub. No.: WO2018/016919
PCT Pub. Date: Jan. 25, 2018

(65) Prior Publication Data
US 2019/0253115 A1    Aug. 15, 2019

Related U.S. Application Data

(60) Provisional application No. 62/365,430, filed on Jul. 22, 2016.

(51) Int. Cl.
*H04W 72/04*    (2009.01)
*H04B 7/06*    (2006.01)

(52) U.S. Cl.
CPC .......... *H04B 7/065* (2013.01); *H04B 7/0643* (2013.01); *H04W 72/042* (2013.01)

(58) Field of Classification Search
USPC .......................................... 375/267; 370/329
See application file for complete search history.

(56) References Cited

U.S. PATENT DOCUMENTS

2010/0002637 A1*  1/2010  Huoviala .......... H04W 72/1247
                                                              370/329
2014/0198676 A1   7/2014  Han et al.
(Continued)

FOREIGN PATENT DOCUMENTS

| KR | 10-2013-0028101 A | 3/2013 |
| KR | 10-2013-0095785 A | 8/2013 |
| WO | WO 2016/089146 A1 | 6/2016 |

*Primary Examiner* — Eva Y Puente
(74) *Attorney, Agent, or Firm* — Birch, Stewart, Kolasch & Birch, LLP

(57) ABSTRACT

Disclosed are a method whereby a terminal measures radio resource management (RRM) in a wireless communication system, in which multiple analogue beams are applied, and devices for supporting same. Disclosed more particularly are: a method whereby a terminal measures RRM according to at least one RRM measurement method of a short-term (ST) RRM measurement method for measuring an instantaneous channel state for each analogue beam and a long-term (LT) RRM measurement method for measuring an average channel state for multiple analogue beams; and devices for supporting same.

20 Claims, 12 Drawing Sheets

(56) References Cited

U.S. PATENT DOCUMENTS

2015/0215856 A1 7/2015 Kim et al.
2017/0303290 A1* 10/2017 Wu ..................... H04W 76/18
2019/0230574 A1* 7/2019 Novlan ................ H04B 17/318

* cited by examiner

METHOD WHEREBY TERMINAL MEASURES RRM IN WIRELESS COMMUNICATION SYSTEM, AND DEVICES FOR SUPPORTING SAME

CROSS REFERENCE TO RELATED APPLICATIONS

This application is the National Phase of PCT International Application No. PCT/KR2017/007898, filed on Jul. 21, 2017, which claims priority under 35 U.S.C. 119(e) to U.S. Provisional Application No. 62/365,430, filed on Jul. 22, 2016, all of which are hereby expressly incorporated by reference into the present application.

TECHNICAL FIELD

The present disclosure relates to a wireless communication system, and more particularly, to a method of performing Radio Resource Management (RRM) measurement by a terminal in a wireless communication system to which multiple analog beams are applied and devices for supporting the same.

More specifically, the present disclosure includes a method in which a terminal performs RRM measurement according to at least one of a Short-Term (ST) RRM measurement method for measuring an instantaneous channel state per analog beam and a Long-Term (LT) RRM measurement method for measuring an average channel state for multiple analog beams and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present disclosure is to provide a method of performing RRM measurement by a terminal in a newly proposed communication system.

In particular, the object of the present disclosure is to provide a method in which when a base station transmits a signal using a different (or independently determined) analog beam per symbol based on beamforming, a terminal performs RRM measurement by considering the signal transmission.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of performing RRM measurement by a terminal in a wireless communication system using multiple analog beams and device therefor.

In an aspect of the present invention, provided is a method of performing Radio Resource Management (RRM) measurement by a user equipment in a wireless communication system using multiple analog beams. The method may include: calculating an RRM measurement value using Beam Reference Signal (BRS) resources according to at least one of a first RRM measurement method for measuring a channel state per analog beam and a second RRM measurement method for measuring an average channel state for multiple analog beams; and when reporting of the RRM measurement value calculated according to the at least one of the first and second RRM measurement methods is triggered, reporting the RRM measurement value calculated according to a triggered RRM measurement method.

In an aspect of the present invention, provided is a user equipment for performing Radio Resource Management (RRM) measurement in a wireless communication system using multiple analog beams. The terminal may include: a transmitter; a receiver; and a processor connected to the transmitter and the receiver. The processor may be configured to: calculate an RRM measurement value using Beam Reference Signal (BRS) resources according to at least one of a first RRM measurement method for measuring a channel state per analog beam and a second RRM measurement method for measuring an average channel state for multiple analog beams; and when reporting of the RRM measurement value calculated according to the at least one of the first and second RRM measurement methods is triggered, report the RRM measurement value calculated according to a triggered RRM measurement method.

According to the present disclosure, calculating the RRM measurement value according to the first RRM measurement method may include measuring a channel state per analog beam applied to each Transmission Reception Point (TRP) during a specific time period.

When the UE receives control information indicating the reporting of the RRM measurement value calculated according to the first RRM measurement method from a network, the UE may report the RRM measurement value using a transmission time and a transmission resource indicated by the control information to at least one base station through Layer 1 signaling or Layer 2 signaling.

In this case, the at least one base station may include at least one of: a base station establishing a Radio Resource Control (RRC) connection with the UE; a base station transmitting downlink control information or system information to the UE; a base station transmitting second control information; and a BS indicated by the second control information.

According to the present disclosure, calculating the RRM measurement value according to the second RRM measurement method may include measuring an average channel state for at least one analog beam applied to a specific base station at every multiple measurement times.

As a particular example, measuring, by the terminal, the average channel state for the at least one analog beam applied to the specific base station at every multiple measurement times may include that the terminal determines a maximum value among received power values on BRS resources for the at least one analog beam applied to the specific base station at each measurement time and calculate an average value of maximum values per measurement times.

As another example, measuring, by the terminal, the average channel state for the at least one analog beam applied to the specific base station at every multiple measurement times may include that the terminal determines a maximum value among received power values on BRS resources for at least one analog beam per antenna port of a BRS for the specific base station at each measurement time and calculate an average value of maximum values per measurement times per antenna port of the BRS.

As a further example, measuring, by the terminal, the average channel state for the at least one analog beam applied to the specific base station at every multiple measurement times may include that the terminal determines an average value of RRM measurement values calculated during a predetermined time period according to the first RRM measurement method as the RRM measurement value calculated according to the second RRM measurement method.

when the terminal receives control information indicating the reporting of the RRM measurement value calculated according to the second RRM measurement method from a network, the terminal may report the RRM measurement value calculated according to the second RRM measurement method using a transmission time and a transmission resource indicated by the control information to at least one base station through Layer 3 signaling.

In this case, the at least one base station may include at least one of a base station establishing a Radio Resource Control (RRC) connection with the terminal; and a base station supporting communication with a Mobility Management Entity (MME).

As another example, when the terminal establishes Radio Resource Control (RRC) connections or Dual Connectivity with a Long-Term Evolution (LTE) base station and a New RAT (NR) base station, the terminal may transmit the RRM measurement value calculated using the BRS resources according to the first RRM measurement method to the NR base station through Layer 1 signaling or Layer 2 signaling and transmit the RRM measurement value calculated using the BRS resources according to the second measurement method to the LTE base station.

The reporting of the RRM measurement value calculated according to the second RRM measurement method may be triggered when a specific event occurs.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, when a base station transmits a signal by applying beamforming in a newly proposed wireless communication system, the base station can be provided with available RRM measurement values.

In particular, according to the present disclosure, a base station can distinguish between an RRM measurement method for supporting analog beam management at a terminal and an RRM measurement method for supporting handover of the terminal. In addition, the terminal can calculate an RRM measurement value according to an RRM measurement method indicated by the base station and then transmit the calculated RRM measurement value to an appropriate Transmission Reception Point (TRP).

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
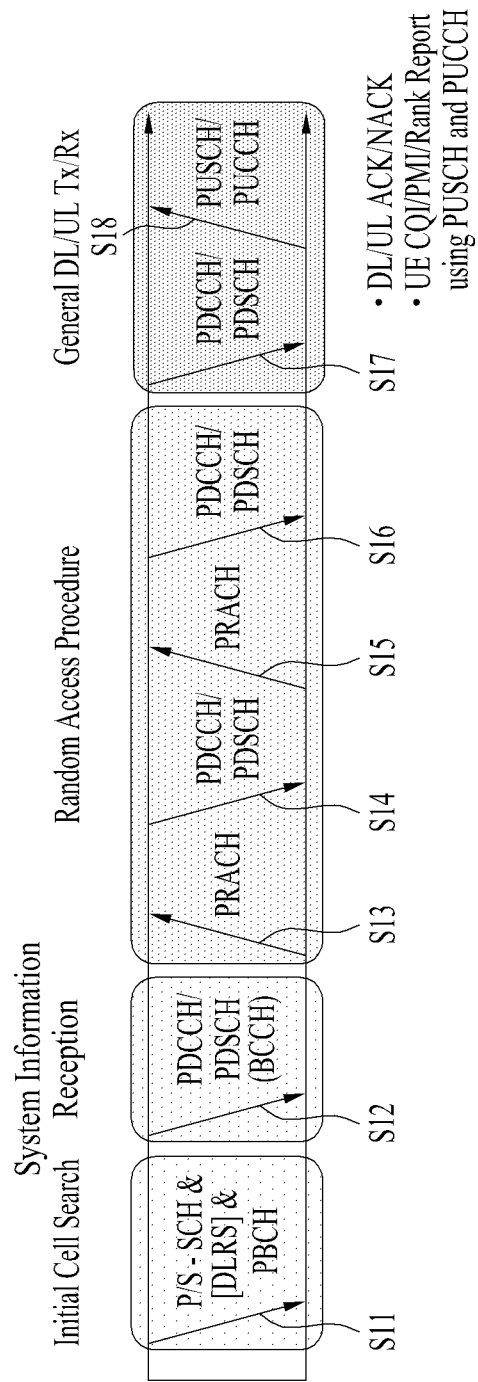
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service, and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1 Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2 Resource Structure

Figure 2:
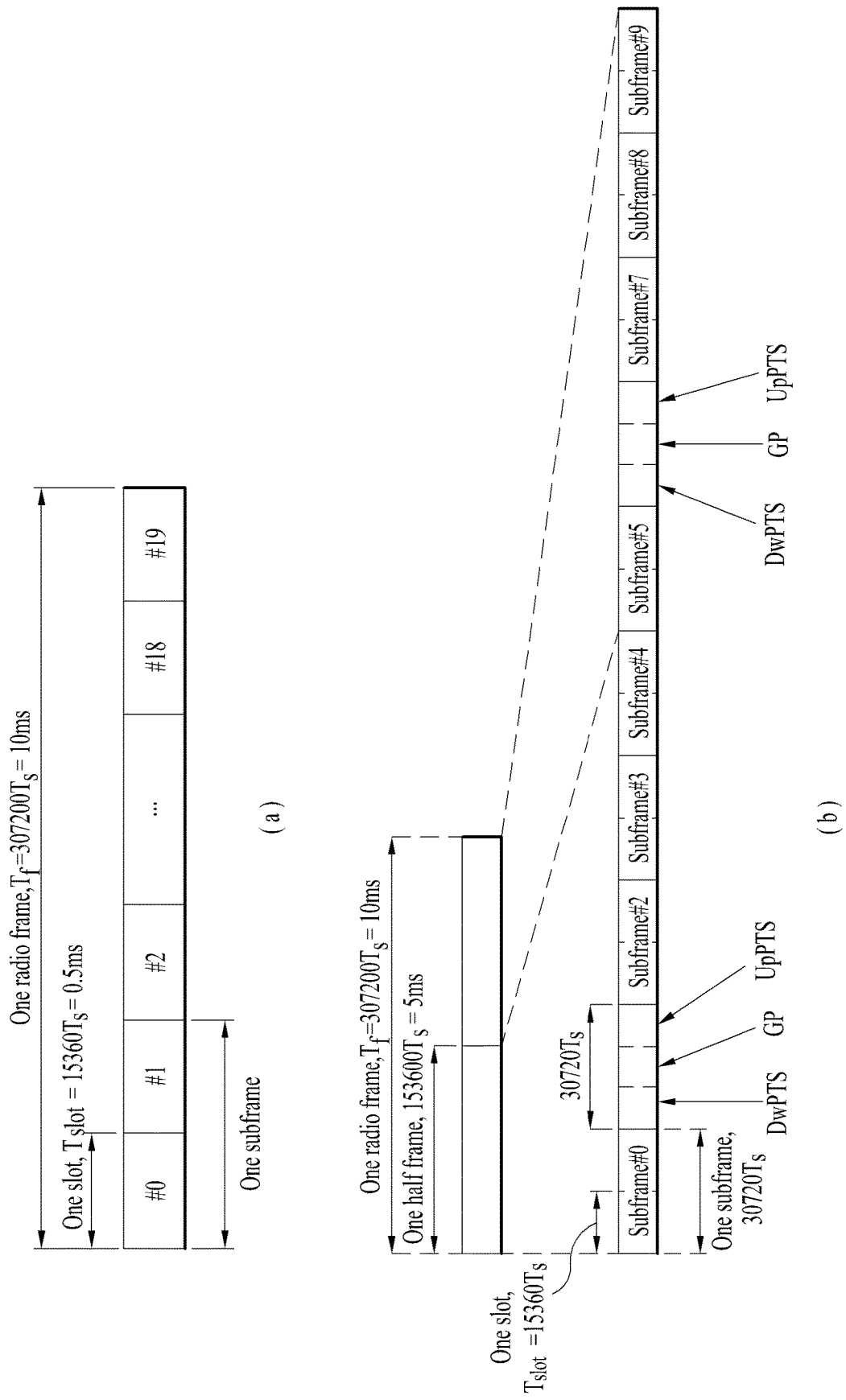
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 shows a special subframe configuration. DwPTS is a period reserved for downlink transmission and UpPTS is a period reserved for uplink transmission.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |

TABLE 1-continued

| | | Normal cyclic prefix in downlink | | | Extended cyclic prefix in downlink | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 4 | 26336 · Ts | 4384 · Ts | 5120 · Ts | 7680 · Ts | 4384 · Ts | 5120 · Ts |
| 5 | 6592 · Ts | | | 20480 · Ts | | |
| 6 | 19760 · Ts | | | 23040 · Ts | | |
| 7 | 21952 · Ts | | | 12800 · Ts | | |
| 8 | 24144 · Ts | | | — | — | — |
| 9 | 13168 · Ts | | | — | — | — |

Figure 3:
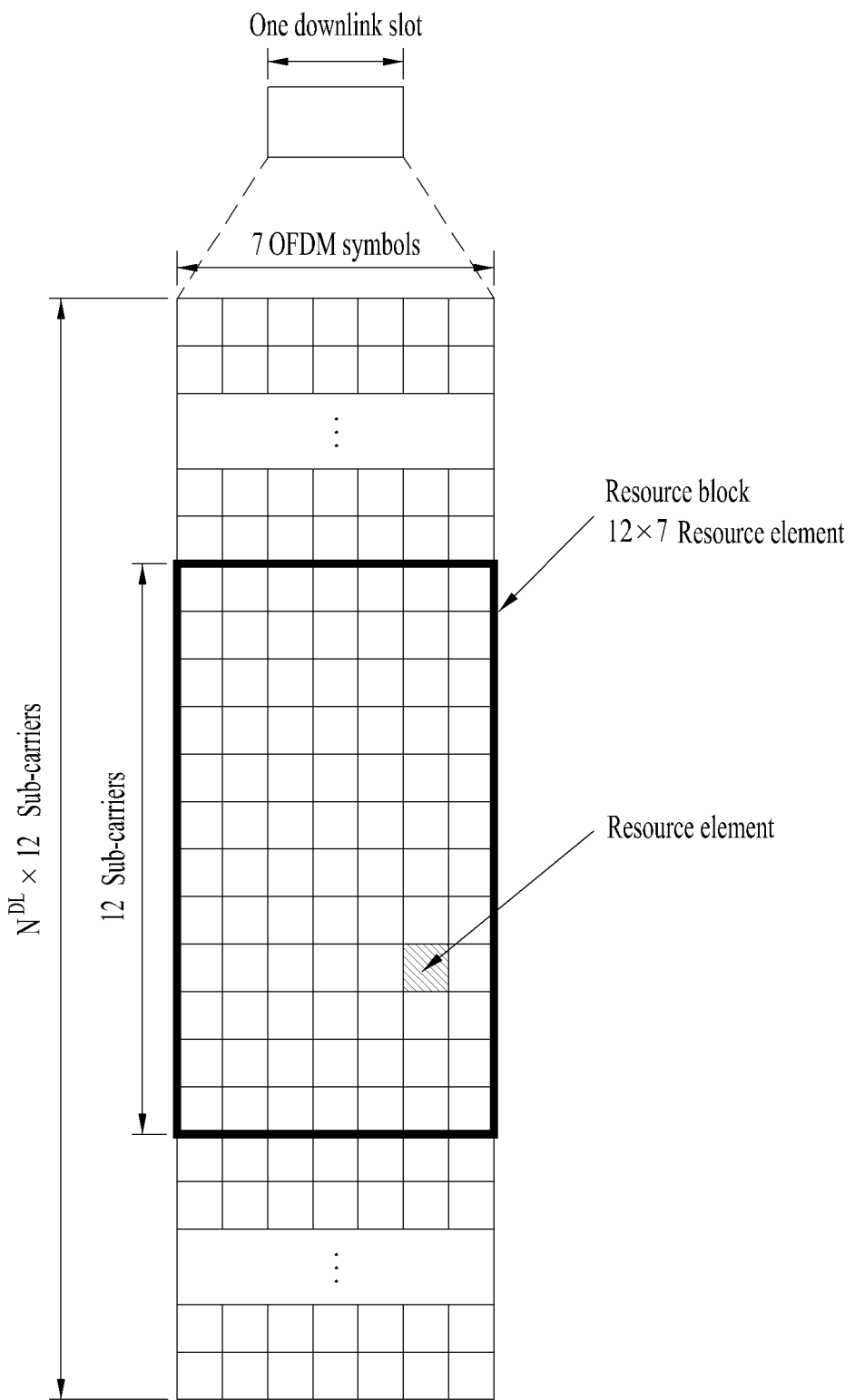
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
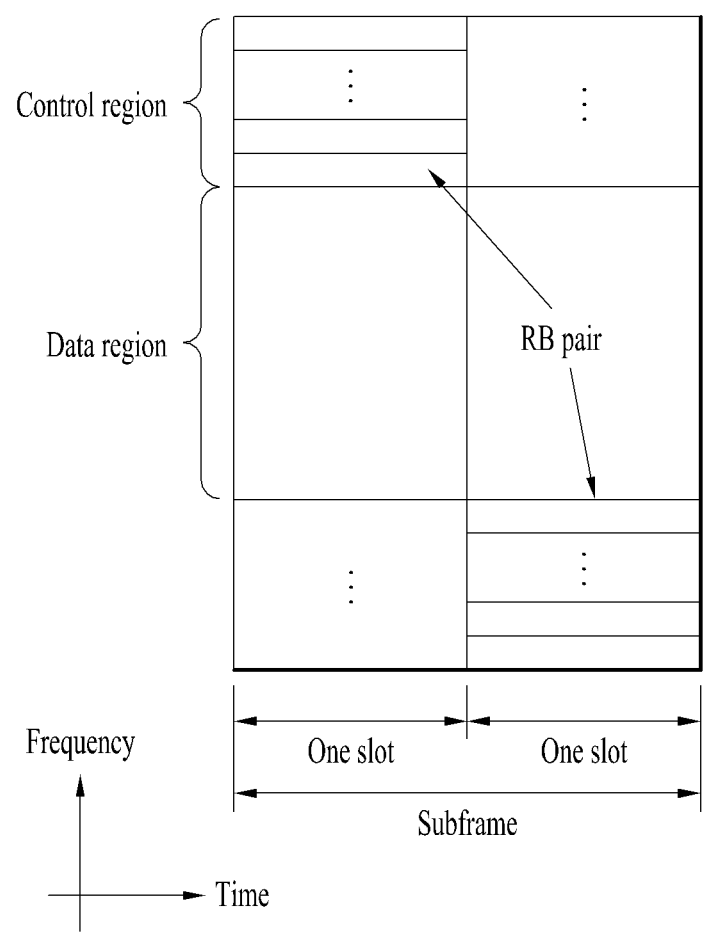
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
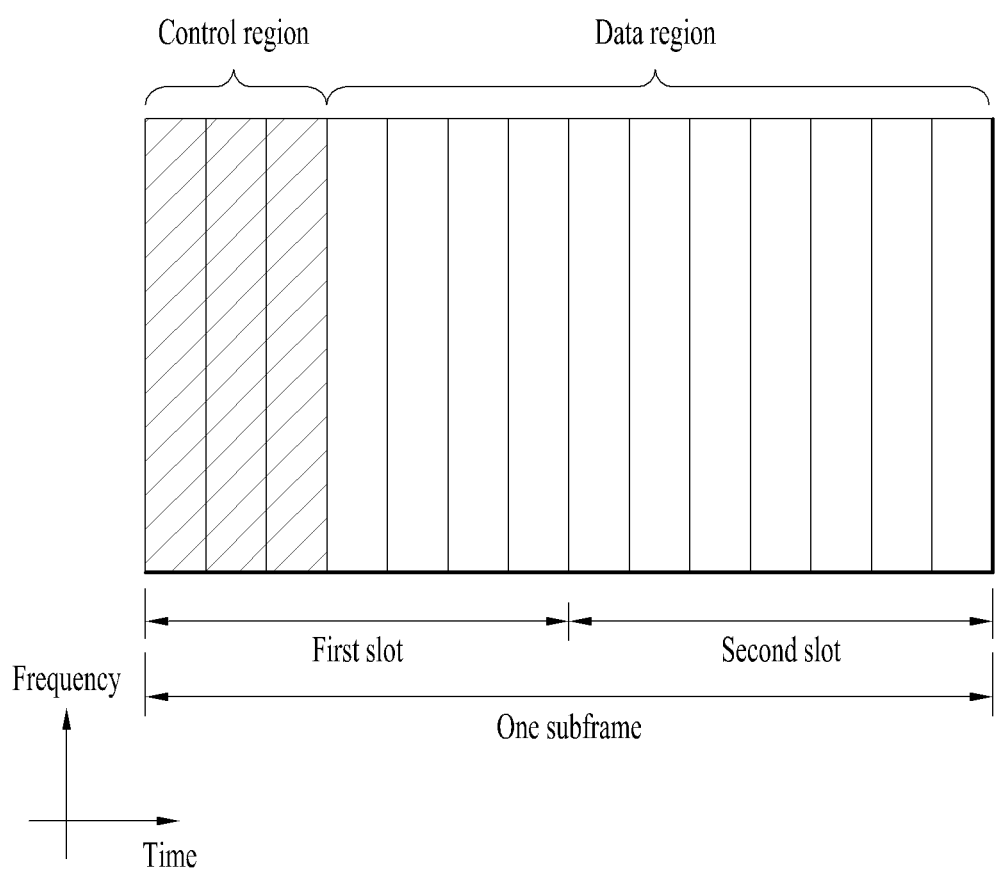
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio $N \times RSRP/(E\text{-}UTRA$ carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIBS. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

1.5. Dual Connectivity

Figure 6:
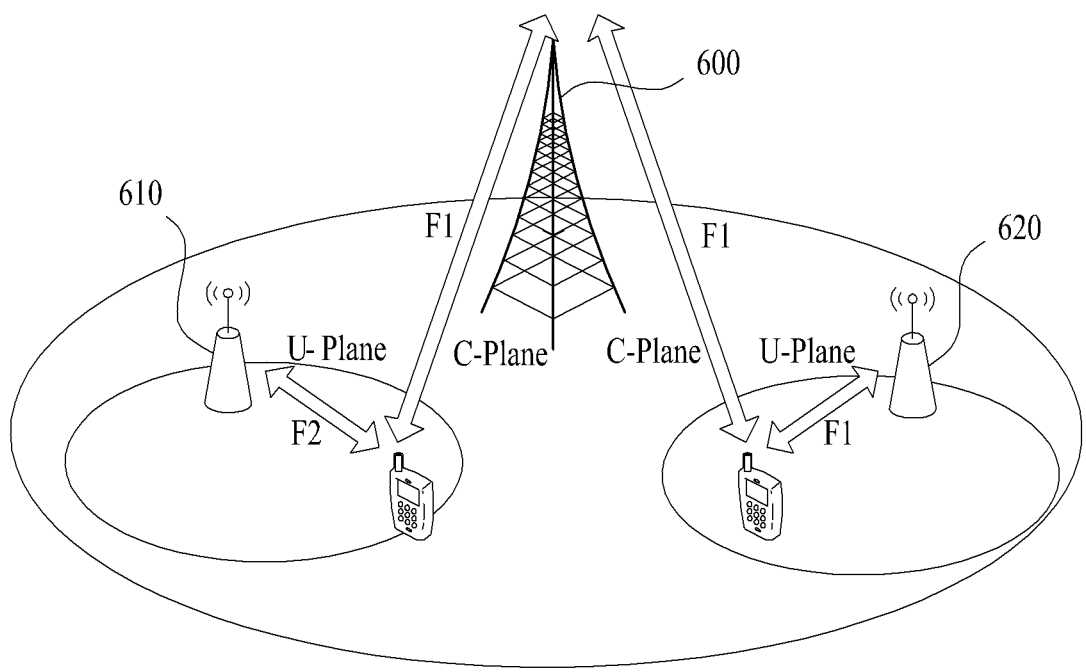
FIG. 6 is a diagram illustrating the concept of dual connectivity applicable to the present disclosure.

FIG. 6 illustrates the concept of dual connectivity applicable to the present disclosure.

Referring to FIG. 6, carrier aggregation may be performed between a macro cell 610 and small cells 620 and 630. That is, the macro cell may use n carriers (where n is a random positive integer), and a small cell may use k carriers (where k is a random positive integer). In this case, the macro and small cells may have the same frequency carriers or different frequency carriers. For example, the macro cell may use random frequencies F1 and F2, and the small cell may use random frequencies F2 and F3.

A random UE in coverage of the small cell may be simultaneously connected to the macro and small cells. The UE may be served by the macro and small cells at the same time or through Time Division Multiplexing (TDM). The UE may be served functions provided by the C-plane (e.g., connection management, mobility, etc.) through a macro cell layer. In the case of the U-plane data path, the UE may select either or both of the macro cell and small cell. For example, in case of real-time data such as Voice over LTE (VoLTE), the UE may use a reception/transmission function provided by the macro cell, which can guarantee better mobility than the small cell. For a best-effort service, the UE may be served by the small cell. The macro and small cells may be connected through backhaul, and the backhaul may be ideal backhaul or non-ideal backhaul.

In addition, the macro and small cells may be configured to use the same system, i.e., one of the TDD and FDD system. Alternatively, the macro and small cells may be configured to use different systems, that is, one cell uses the TDD system, and the other cell uses the FDD system.

The concept of the dual connectivity has been described with reference to FIG. 6. The macro and small cells may use the same or different frequency bands. If a random UE is configured to operate in dual connectivity mode, the UE may be connected to the macro and small cells at the same time. FIG. 6 shows a case in which a small cell is set as the U-plane data path.

Although the present disclosure describes that the random UE is dual-connected to the macro and small cells for convenience of description, the disclosure is not limited to cell types (e.g., macro cell, micro cell, pico cell, femto cell, etc.). In addition, although the present invention describes that the random dual-connectivity UE configures Carrier Aggregation (CA) by setting the macro cell to a Primary cell (Pcell) and the small cell to a Secondary cell (Scell), the invention is not limited thereto.

In particular, according to the present disclosure, a single UE can be dual-connected to a BS in the LTE system and a Transmission Reception Point (TRP) in the NR system.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 7:
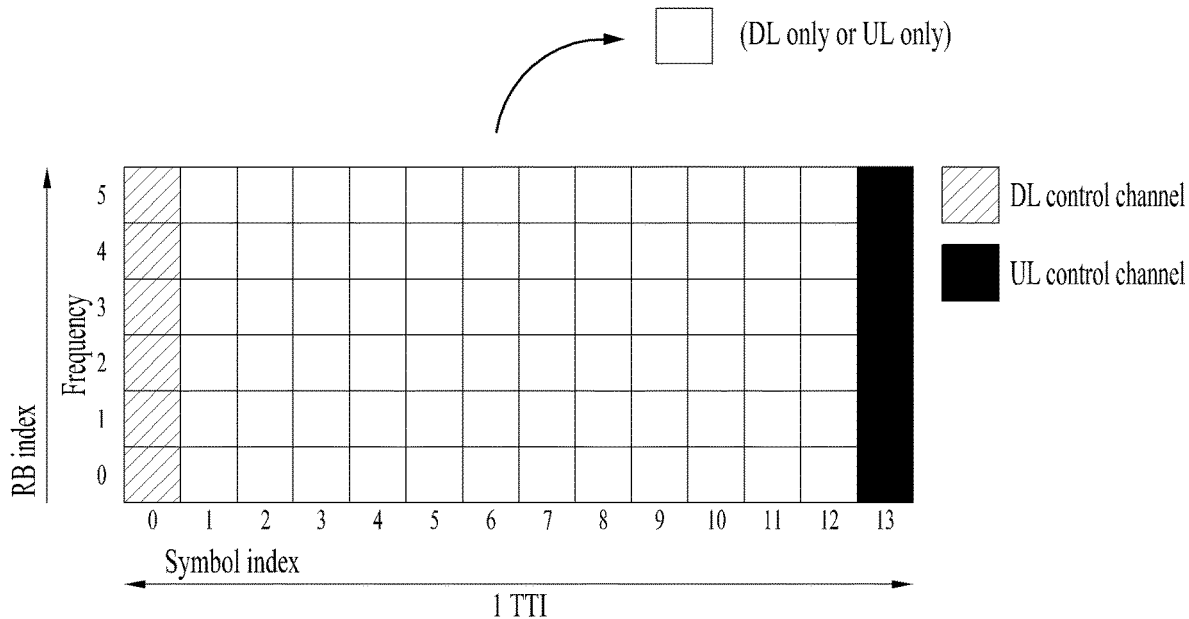
FIG. 7 is a diagram illustrating a self-contained subframe structure applicable to the present invention.

FIG. 7 is a diagram illustrating a self-contained subframe structure applicable to the present invention.

In the NR system to which the present invention is applicable, a self-contained subframe structure as shown in FIG. 7 is proposed in order to minimize data transmission latency in the TDD system.

In FIG. 7, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 7.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme and may use an OFDM numerology selected from among multiple OFDM numerologies as shown in Table 3. Specifically, as disclosed in Table 3, the NR system may take the 15 kHz subcarrier-spacing used in the LTE system as a base and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 8:
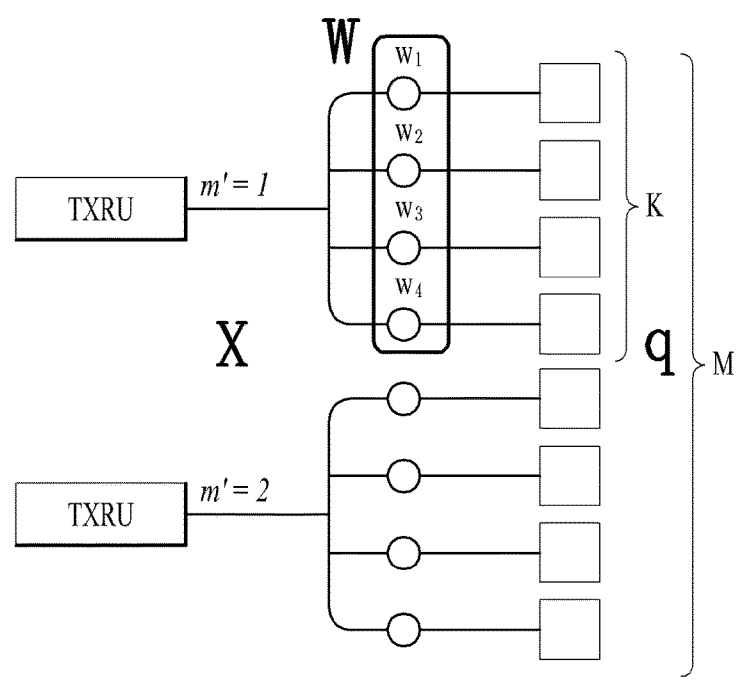
FIGS. 8 and 9 are diagrams illustrating representative methods for connecting TXRUs to antenna elements.
Figure 9:
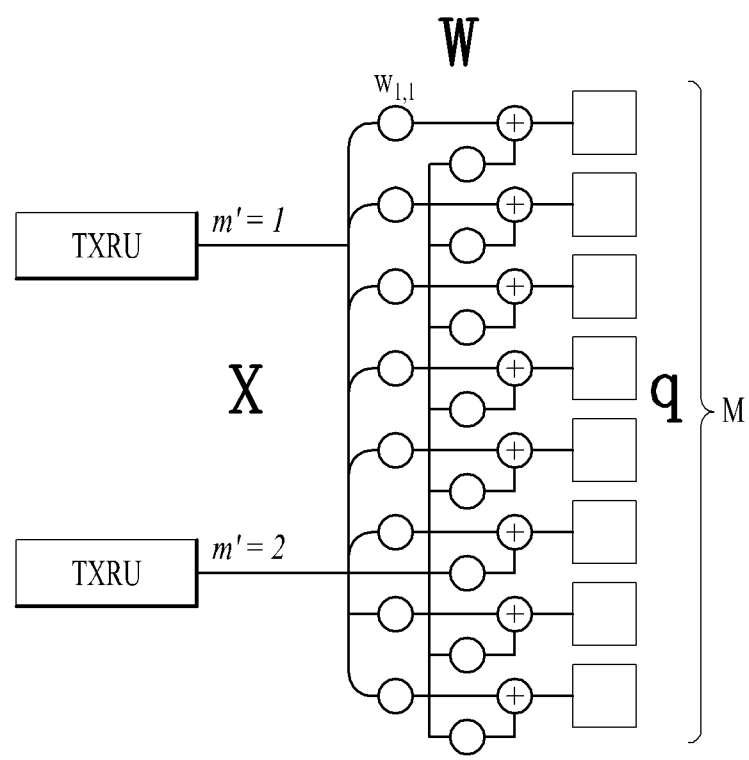

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to sub-arrays. In FIG. 8, one antenna element is connected to one TXRU.

Meanwhile, FIG. 9 shows a method for connecting all TXRUs to all antenna elements. In FIG. 9, all antenna elements are connected to all TXRUs. In this case, separate addition units are required to connect all antenna elements to all TXRUs as shown in FIG. 9.

In FIGS. 8 and 9, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 8 has a disadvantage in that it is difficult to achieve beamforming focusing but has an advantage in that all antennas can be configured at low cost.

On the contrary, the configuration shown in FIG. 9 is advantageous in that beamforming focusing can be easily achieved. However, since all antenna elements are connected to the TXRU, it has a disadvantage of high cost.

3. Proposed Embodiments

Hereinafter, a method by which a BS transmits DL control information to a UE in a DL control region where the BS can perform transmission by applying a different (or independent) analog beam (predefined between the BS and UE) per symbol (or per specific time unit) (hereinafter, such a DL control region is referred to as a beam sweeping DL control region) when managing analog beamforming that can be randomly changed over time will be described based on the above technical configurations.

For the above-described NR system, the network slicing method where a plurality of logical networks are implemented on a single physical network has been considered. The logical network should be able to support various services with different purposes (for example, enhanced Mobile Broadband (eMBB), massive Machine Type Communication (mMTC), Ultra-Reliable Low Latency Communication (URLLC), etc.). In addition, a flexible structure capable of applying an Orthogonal Frequency Division Multiplexing (OFDM) scheme with numerology suitable for a service to be provided has also been considered for radio communication (or physical layers) in the NR system. In other words, an OFDM scheme (or multiple access scheme) for supporting different numerology in each time and frequency resource region has been considered in the NR system.

Recently, data traffic has rapidly increased due to the advent of smart devices, and thus, it has been required that the NR system should be able to support much higher communication capacity (e.g., data throughput). In this case, a method of performing data transmission using multiple transmission (or reception) antennas may be considered to improve communication capacity. If digital beamforming is applied to multiple antennas, a Radio Frequency (RF) chain (i.e., a chain composed of RF devices such as a power amplifier, a down converter, etc.) and a D/A (or A/D) converter (i.e., a digital-to-analog converter or an analog-to-digital converter) need to be installed in each of the multiple antennas. However, this structure is not practical because of high hardware complexity and high power consumption.

Therefore, the present disclosure proposes to use a hybrid beamforming method where digital beamforming and analog beamforming are used together when multiple antennas are used in the NR system to which the present disclosure is applicable. Herein, the analog beamforming (or RF beamforming) means that precoding (or combining) is performed at an RF end.

Meanwhile, the hybrid beamforming means that precoding (or combining) is performed at baseband and RF ends, respectively. The hybrid beamforming is advantageous in that it can guarantee performance similar to the digital beamforming while reducing the number of RF chains and the number of D/A (or A/D) converters. For convenience of description, the hybrid beamforming structure can be represented as N Transceiver units (TXRUs) and M physical antennas in the following description. In this case, digital beamforming for L data layers to be transmitted at a transmitting end can be represented as an N*L matrix. Thereafter, N converted digital signals are converted into analog signals after passing through the TXRUs, and then analog beamforming expressed as an M*N matrix may be applied thereto.

Figure 10:
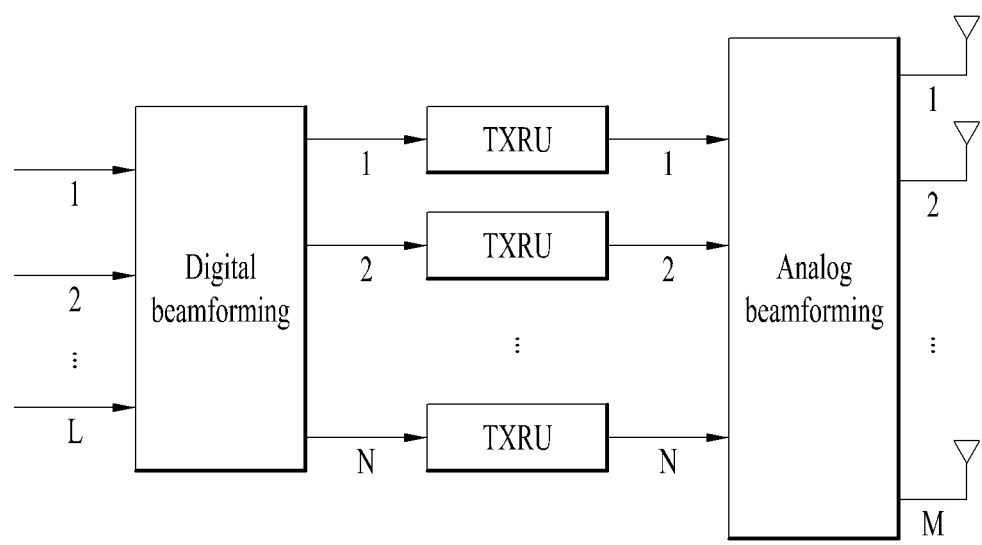
FIG. 10 is a diagram schematically illustrating a hybrid beamforming structure in terms of TXRUs and physical antennas.

FIG. 10 illustrates a hybrid beamforming structure in terms of TXRUs and physical antennas. In FIG. 10, it is assumed that the number of digital beams is L and the number of analog beams is N.

Additionally, it is considered in the NR system to which the present disclosure is applicable that a BS is designed to change analog beamforming on a symbol basis in order to provide more efficient beamforming to a UE located in a specific area. Further, when one antenna panel is defined by N TXRUs and M RF antennas as shown in FIG. 10, the introduction of a plurality of antenna panels to which independent hybrid beamforming is applicable is also considered.

When a BS uses a plurality of analog beams as described above, each UE may prefer a different analog beam for signal reception. Thus, the NR system to which the present disclosure is applicable considers supporting an operation in which a BS changes a plurality of analog beams on a symbol basis in a specific subframe at least with respect to Synchronization Signals (SSs), system information, paging, etc. (this operation is called beam sweeping). By doing so, the BS can provide all UEs with reception opportunities.

Figure 11:
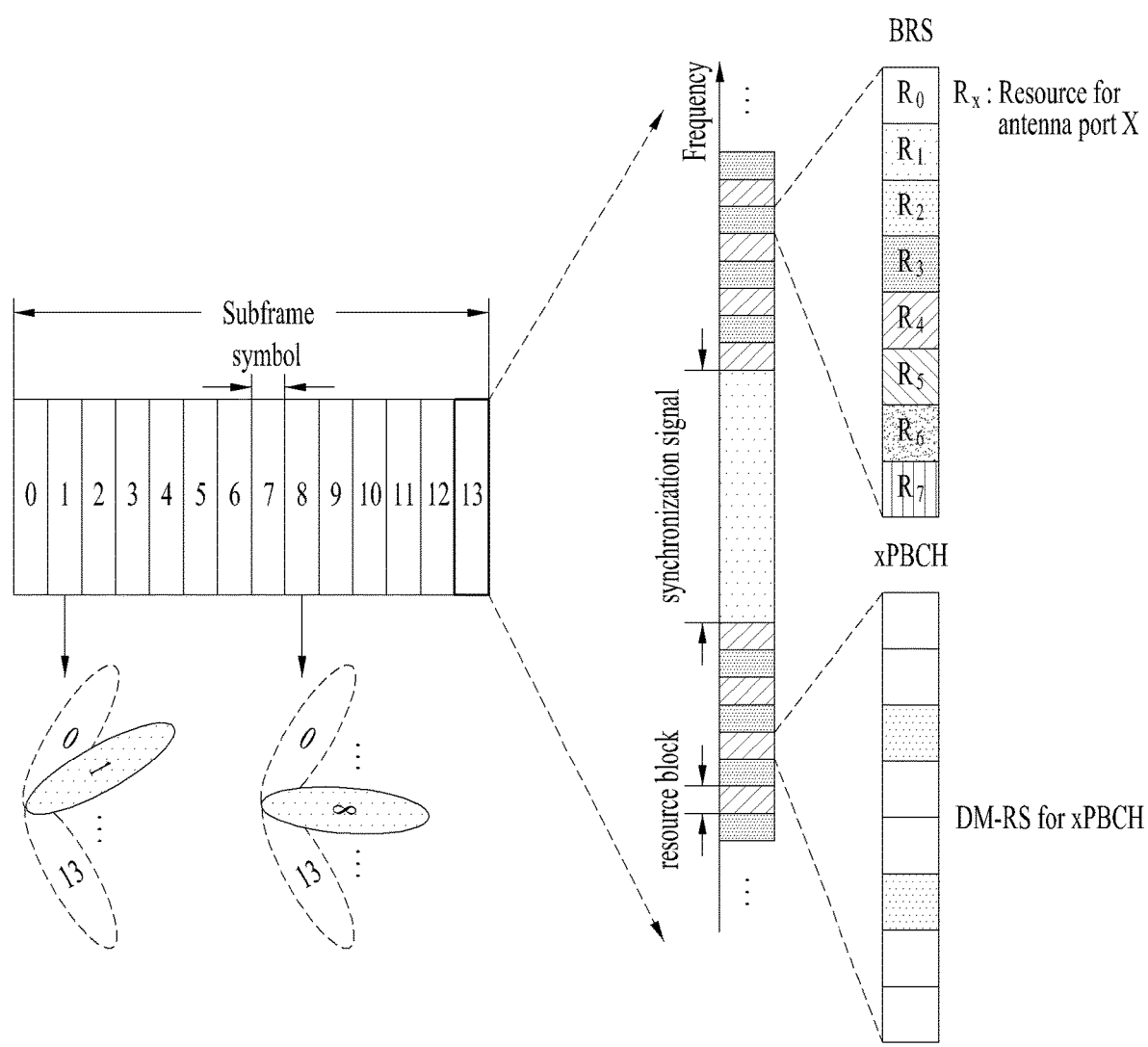
FIG. 11 is a diagram schematically illustrating a beam sweeping operation for an Synchronization Signal (SS) and system information during downlink (DL) transmission.

FIG. 11 schematically illustrates a beam sweeping operation for an SS and system information during DL transmission. In FIG. 11, a physical resource (or channel) for broadcasting system information of the NR system to which the present disclosure is applicable is referred to as a physical broadcast channel (xPBCH).

In this case, analog beams belonging to different antenna panels can be simultaneously transmitted in one symbol.

In addition, the NR system to which the present disclosure is applicable considers the introduction of a Beam Reference Signal (BRS) corresponding to a Reference Signal (RS) that is transmitted by applying a single analog beam (corresponding to a specific antenna panel) as shown in FIG. 11 in order to measure a channel per analog beam. BRSs can be defined for a plurality of antenna ports, and each BRS antenna port may correspond to a single analog beam. In contrast to the BRS, all analog beams in an analog beam group may be applied to an SS or xPBCH to allow a random UE to correctly receive the SS or xPBCH.

In the NR system to which the present disclosure is applicable, a UE needs to measure a channel for RRM. Thus, how a UE performs RRM measurement and which resources the UE uses for the RRM measurement should be defined.

Therefore, the present disclosure proposes an RRM measurement method where an analog beam group applicable to the NR system is considered. In addition, the present disclosure defines xRSRP, xRSSI, and xRSRQ for the NR system as counterparts of the RSRP, RSSI, and RSRQ of the LTE system. The xRSSI, xRSSI, and xRSRQ means average received power (per resource element) for specific measurement resources for the RRM measurement, average received power where all signals in symbols are considered, and a relative ratio between the xRSRP and xRSSI, respectively. Accordingly, Equation 1 below can be applied between the xRSRQ, xRSRP, and xRSSI.

$$xRSRQ \propto xRSRP/xRSSI \qquad [\text{Equation 1}]$$

For convenience of description, an RS (or known signal) used for the RRM measurement is referred to as an RRM RS, and a point where DL/UL signals are exchanged with a UE is referred to as a Transmission and Reception Point (TRP). The TRP may correspond to a specific physical cell, a plurality of physical cell groups, or a specific analog beam (or analog beam groups).

In addition, an antenna port means a virtual antenna element where the same channel characteristics (e.g., delay profile, Doppler spread, etc.) can be assumed (at least in the same resource block). Moreover, a Synchronization Signal (SS) means a reference signal for a UE to achieve time synchronization with a specific TRP in order to perform transmission and reception to and from the specific TRP, and a subframe (SF) means a basic transmission unit with a predetermined time length. The definition of the SF may vary depending on which numerology is applied. For example, the absolute length of the SF may be configured differently depending on numerology.

Further, configuration information transmitted for the RRM measurement from a TRP to a UE through a higher layer signal is referred to as a measurement configuration, and the measurement configuration may include an index of a TRP (corresponding to a measurement target), resource allocation information and sequence information for an RRM RS, a bandwidth for the RRM measurement, etc.

Hereinafter, a method in which a UE performs short-term RRM measurement and long-term RRM measurement methods and reports RRM results measured using the short-term RRM measurement and long-term RRM measurement methods will be described in detail.

3.1. Short-Term (ST) RRM Measurement and Reporting Method 3.1.1. First ST RRM Measurement and Reporting Method When a UE performs the RRM measurement, the UE can perform the ST RRM measurement for a TRP transmitting a DL control signal (or system information) to the UE and/or a TRP set configured by a network (though a higher layer signal).

More specifically, the UE may measure and calculate xRSRP (or xRSRQ) per analog beam of a TRP using RRM RS (e.g., BRS) resources at a specific transmission time (single slot) or during a specific time period (single period) for the above targets. Here, the specific transmission time or specific time period at or during which the RRM RS (e.g., BRS) resources are used may be relatively determined with respect to a time at which results of the corresponding ST RRM measurement are reported or a time at which the corresponding reporting is requested.

In the NR system to which the present disclosure is applicable, hybrid or analog beamforming can be applied, and thus one TRP may manage a plurality of analog beams. When a BS (e.g., serving TRP) transmits data to a UE, it is desirable that the BS transmits the data via an analog beam optimized from the perspective of UE reception. Thus, to support analog beam management at the BS, the UE should be able to measure a channel state per analog beam and report the measured channel state to the BS.

The present disclosure defines an operation in which a UE measures an instantaneous channel state per analog beam and reports the measured channel state as the ST RRM measurement and proposes a method in which a UE performs the ST RRM measurement for TRPs that can actually receive data.

As one particular ST RRM measurement method, a UE may measure xRSRP (or xRSRQ) of a specific analog beam using an RRM RS at a specific time or RRM RS resources during a relatively short time period. If a network supports or configures multi-TRP operation where a plurality of TRPs can perform data transmission and reception, the network may inform the UE of RRM RS resource information of the TRPs, and the UE may perform the ST RRM measurement for each of the TRPs.

3.1.2. Second ST RRM Measurement and Reporting Method

When a UE performs the RRM measurement, a BS can instruct to report ST RRM measurement results through a specific control signal (e.g., DCI) (in this case, the BS can also inform a UL transmission time at which the UE should transmit the corresponding report and a UL resource therefor. Upon receiving the specific control signal, the UE can report the ST RRM measurement results to the following TRPs through L1 signaling (i.e., PHY signaling) or L2 signaling (i.e., MAC signaling).

(1) A TRP with a Radio Resource Control (RRC) connection (2) A TRP transmitting a DL control signal (or system information) to the UE (3) A TRP transmitting a control signal requesting reporting of ST RRM measurement results (4) A TRP indicated by a control signal requesting reporting of ST RRM measurement results In this case, the UE may report ST RRM measurement results (e.g., xRSRP, xRSRQ, etc.) of M best analog beams from the perspective of reception (or M analog beams predetermined by the BS) using a UL resource predetermined (or indicated) by the BS at a transmission time predetermined (or indicated) by the BS.

According to the present disclosure, since the purpose of the ST RRM measurement is to assist a BS (e.g., serving TRP) in selecting an analog beam for data transmission, it is desirable that a UE performs the ST RRM measurement and reports results thereof at a time preferred by the BS.

In addition, although a UE may report ST RRM measurement results to a TRP having an RRC connection therewith, the UE can also report the RRM measurement value to a TRP that transmits data to the UE and can communicate through L1 signaling or L2 signaling because the purpose of the ST RRM measurement is for determination of a scheduling analog beam for data transmission rather than for mobility management at a Mobility Management Entity (MME). Therefore, the UE may report, to a TRP transmitting a control signal requesting reporting of ST RRM measurement results (or a TRP indicated by a control signal), ST RRM measurement results of a beam group of the corresponding TRP.

3.2. Long-Term (LT) RRM Measurement and Reporting Method 3.2.1. First LT RRM Measurement and Reporting Method When a UE performs the RRM measurement, the UE can perform the LT RRM measurement for a TRP set where the UE intends to perform RRM for cell selection or a neighbor TPR set where LT RRM is instructed by a BS for handover (HO) (through a higher layer signal).

More specifically, the UE may perform the LT RRM measurement for the following targets according to one of the following options.

(1) Option 1: The UE measures a received power value for the best beam at each measurement time using RRM RS (e.g., BRS) resources for a beam group of a TRP and then computes an average value in the time domain. In other words, the UE may compute the time-domain average value of the maximum values at the individual times among the received power values for the beam group of the TRP. Thereafter, the UE may calculate xRSRP (or xRSRQ) based on the average value.

(2) Option 2: The UE measures a received power value for the best beam at each measurement time using RRM RS resources for a beam group per antenna port of an RRM RS (e.g., BRS) of a TRP and then computes an average value in the time domain. In other words, the UE may compute the time-domain average value of the maximum values at the individual times among the received power values for the beam group per antenna port of the RRM RS. Thereafter, the UE may calculate xRSRP (or xRSRQ) per antenna port of the RRM RS (e.g., BRS) based on the average value.

In this case, the UE may report xRSRP (or xRSRQ) of all antenna ports of the RRM RS (e.g., BRS) through the LT RRM measurement. In addition, each antenna port of the RRM RS (e.g., BRS) may corresponding to an antenna panel.

(3) Option 3: The UE uses an average value obtained from the ST RRM measurement during a prescribed time period (e.g., 100 ms) (or xRSRP or xRSRQ calculated from the average value) as an LT RR measurement value.

In the above-described method, the RRM RS resources for the LT RRM measurement may be equal to those of the ST RRM measurement.

In addition, when the UE calculate the time-domain average value of the maximum values at individual measurement times among the received power values for the beam group, the UE may perform the calculation of the time-domain average value in a specific time widow.

Moreover, the measurement of the received power for the beam group at each measurement time may include measurement of received power for beams generated by beam sweeping operation. In particular, a beam group per antenna port may mean a beam group in accordance with the beam sweeping operation, and the UE may measure the received power for all beams in the beam group at once.

More specifically, when intending to perform UE handover (HO) between TRPs, the BS (e.g., serving TRP) should be able to estimate an average channel state of a neighbor TRP. Thus, the present disclosure proposes a method of performing the LT RRM measurement where a UE measures an average channel state for a beam group of a TRP, which is different from the above-described ST RRM measurement. In this case, an LT RRM measurement value for a specific TRP can be defined as a value that a UE obtains by measuring received power of the best beam for a beam group of the corresponding TRP at each measurement time and then averaging the received power values for the best beam in the time domain.

The operation in which the UE calculates the time-domain average value of the envelope of the received power values for the specific beam group may also be applied to a beam group per antenna port of the RRM RS. In this case, as the LT RRM measurement, an operation of measuring a time-domain average value of an envelope of a plurality of RRM RS antenna ports may be applied.

Figure 12:
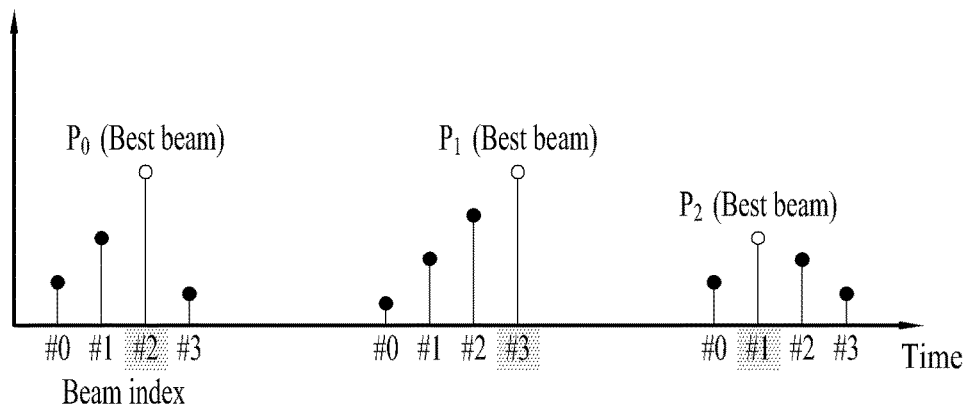
FIG. 12 is a diagram schematically illustrating a Long-Term (LT) Radio Resource Management (RRM) measurement method when there are four beam groups in a TRP.

FIG. 12 schematically illustrates a Long-Term (LT) RRM measurement method when there are four beam groups in a TRP.

In FIG. 12, a UE measures received power three times within a time window for calculating an average in the time domain. The best beam in the first measurement is beam #2, and the UE measures received power of $P_0$ in the first time window. Next, the best beam in the second measurement is beam #3, and the UE measures received power of $P_1$ in the second time window. Lastly, the best beam in the third measurement is beam #1, and the UE measures received power of $P_2$ in the third time window.

Thereafter, the UE may use a value obtained by averaging the received power values (i.e., $P_0$, $P_1$, and $P_2$) for the best beams at the individual times in the time domain as an LT RRM measurement value.

3.2.2. Second LT RRM Measurement and Reporting Method

When a UE performs the RRM measurement, the UE can use an SS and/or an xPBCH Demodulation-Reference Signal (DM-RS) as RRM RS resources for the LT RRM measurement.

In this case, the RRM RS resources for the LT RRM measurement may be different from those for the ST RRM measurement.

However, the RRM RS resources for the LT RRM measurement may be transmitted from TRPs performing the multi-TRP operation in a Single Frequency Network (SFN) manner. In other words, the TRPs performing the multi-TRP operation may transmit the same RRM RS on the same resources at the same time.

Specifically, the multi-TRP operation, which is configured by a network to enable a UE to receive data from multiple TRPs, can be considered as described in section 3.1.1. In this case, from the perspective of the UE, a HO target may be a TRP group performing the multi-TRP operation rather than a specific TRP among the multiple TRPs.

For example, if a BS needs to perform (or support) perform HO of a specific UE between a specific TRP not performing the multi-TRP operation and a TRP group performing the multi-TRP operation, it may be more desirable that the BS hands over the specific UE to the TRP group performing the multi-TRP operation in terms of data transmission at the UE. Therefore, the LT RRM measurement should be able to reflect a weighted value for the multi-TRP operation.

As one method, a UE may use RS resource transmitted from TRPs performing the multi-TRP operation in an SFN manner as the RRM RS resources for the LT RRM measurement. In this case, the RRM RS resources for the LT RRM measurement may be different from those for the ST RRM measurement.

3.2.3. Third LT RRM Measurement and Reporting Method

When a UE performs the RRM measurement, a BS can allocate a UL transmission resource in order for the UE to report LT RRM measurement results according to one of the following methods.

(1) A UL data transmission resource (e.g., PUSCH) indicated by a UL grant (2) A UL data transmission resource (e.g., PUSCH) of which a transmission time and resource are predetermined (through a higher layer)

Depending on event triggering methods, the UE can report the LT RRM measurement results to the following TRPs through L3 signaling (e.g., RRC signaling) (or using a higher layer signal than L1/L2 signaling).

1) A TRP with a Radio Resource Control (RRC) connection

2) A TRP supporting communication with a Mobility Management Entity (MME) (e.g., TRP capable of forwarding a Non-Access Spectrum (NAS) message)

In this case, the MME may be defined as an entity managing UE's mobility between TRPs.

According to the present disclosure, since the LT RRM measurement can be performed for UE handover (HO) between TRPs, the corresponding measurement results should be collected and managed by an entity (e.g., MME) at a higher level than a TRP.

Therefore, the LT RRM measurement results can be reported to a TRP supporting communication between a specific UE and the MME (or a TRP supporting a signaling radio bearer).

Alternatively, assuming that information exchanged between the UE and MME is a NAS message, if the NAS message is encapsulated and transmitted through RRC signaling between the UE and BS, the UE may report the LT RRM measurement results to a TRP having an RRC connection therewith.

Figure 13:
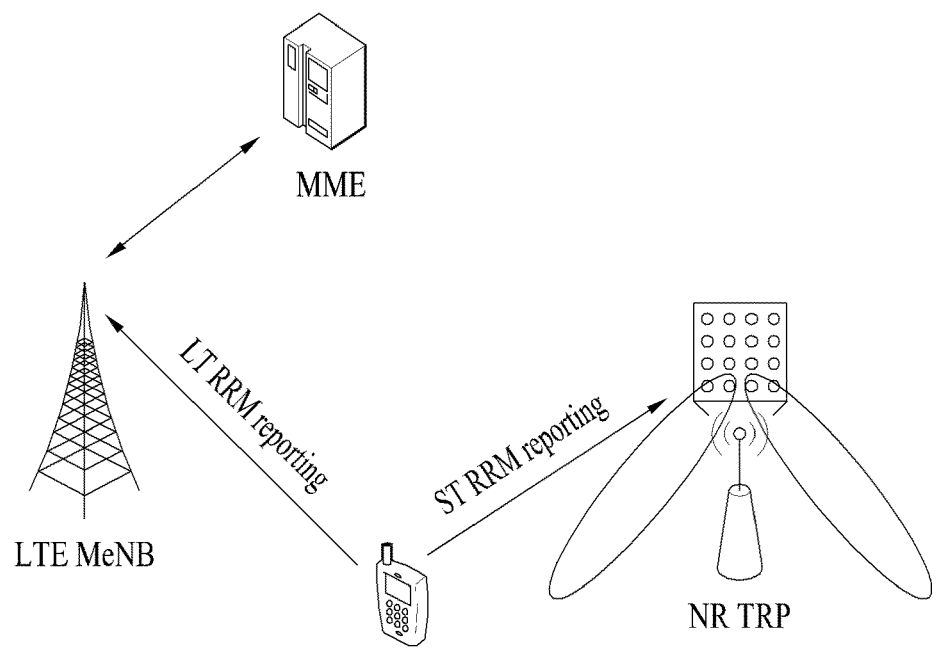
FIG. 13 is a diagram illustrating an RRM reporting method when a UE configures Radio Resource Control (RRC) connections or Dual Connectivity (DC) with a Long-Term Evolution (LTE) base station and a New RAT (NR) base station (or NR cell)

FIG. 13 illustrates an RRM reporting method when a UE configures RRC connections or Dual Connectivity (DC) with an LTE BS and an NR BS (or NR cell).

As shown in FIG. 13, if the UE establishes RRC connections or dual connectivity with the LTE BS and NR TRP such that a signaling radio bear is formed only with the LTE BS, the UE may report ST RRM measurement results for analog beam switching (or analog beam management) at a BS to only the NR TRP through L1/L2 signaling (or an L1/L2 procedure) and report LT RRM measurement results for management of HO or Radio Link Failure (RLF) to the LTE BS. That is, a beam switching procedure for a UE at an NR cell may be transparent to an LTE BS (e.g., MeNB).

3.2.4. Fourth LT RRM Measurement and Reporting Method

When a UE performs the RRM measurement, the UE can request allocation of a UL resource (e.g., PUSCH) for reporting LT RRM measurement results.

More specifically, when the UE performs the LT RRM measurement, the UE may perform reporting of the corresponding LTE RRM measurement results in an on-demand manner. That is, if the UE has a low-quality link, the UE may inform a current serving TRP that the UE desires to report the LT RRM measurement results. In other words, the UE may send a signal for triggering the resource allocation for reporting the LT RRM measurement results to the BS first. By doing so, the BS can support HO of the UE more rapidly.

As described above, according to the present disclosure, a UE can perform the ST and/or LT RRM measurement and report RRM measurement values to appropriate TRPs.

Accordingly, an RRM measurement method performed by a UE may include: calculating an RRM measurement value using Beam Reference Signal (BRS) resources according to at least one of a first RRM measurement method for measuring a channel state per analog beam and a second RRM measurement method for measuring an average channel state for multiple analog beams; and when reporting of the RRM measurement value calculated according to the at least one of the first and second RRM measurement methods is triggered, reporting the RRM measurement value calculated according to a triggered RRM measurement method.

According to the present disclosure, calculating the RRM measurement value according to the first RRM measurement method may include measuring, by the UE, a channel state per analog beam applied to each BS during a specific time period. In this case, the UE may perform the RRM measurement for at least one of the following targets: a BS transmitting a DL control signal or system information to the UE; and a BS set configured by a network.

When the UE receives control information indicating the reporting of the RRM measurement value calculated according to the first RRM measurement method from a network, the UE may report the RRM measurement value calculated according to the first RRM measurement method using a transmission time and a transmission resource indicated by the control information to at least one BS through Layer 1 signaling or Layer 2 signaling.

Here, the at least one BS may include at least one of: a BS establishing a Radio Resource Control (RRC) connection with the UE; a BS transmitting downlink control information or system information to the UE; a BS transmitting second control information; and a BS indicated by the second control information.

In addition, according to the present disclosure, calculating the RRM measurement value according to the second RRM measurement method may include measuring an average channel state for at least one analog beam applied to a specific base station over multiple measurement times.

As a first particular example, the UE may determine a maximum value among received power values on BRS resources for the at least one analog beam applied to the specific base station at each measurement time and then calculate an average value of maximum values at the individual measurement times.

As a second particular example, the UE may determine a maximum value among received power values on BRS resources for at least one analog beam per antenna port of a BRS for the specific base station at each measurement time and then calculate an average value of maximum values at the individual measurement times per antenna port of the BRS.

As a third particular example, the UE may determine an average value of RRM measurement values calculated during a predetermined time period (e.g., 100 ms) according to the first RRM measurement method as the RRM measurement value calculated according to the second RRM measurement method.

When the UE receives control information indicating the reporting of the RRM measurement value calculated according to the second RRM measurement method from a network, the UE may report the RRM measurement value calculated according to the second RRM measurement method using a transmission time and a transmission resource indicated by the control information to at least one base station through Layer 3 signaling.

Here, the at least one BS may include at least one of a BS establishing a Radio Resource Control (RRC) connection with the UE and a BS supporting communication with a Mobility Management Entity (MME).

As another example, when the UE establishes Radio Resource Control (RRC) connections or Dual Connectivity with a Long-Term Evolution (LTE) BS and a New RAT (NR) BS, the UE may transmit the RRM measurement value calculated using the BRS resources according to the first RRM measurement method to the NR base station through Layer 1 signaling or Layer 2 signaling and transmit the RRM measurement value calculated using the BRS resources according to the second measurement method to the LTE base station.

In this case, the reporting of the RRM measurement value calculated according to the second RRM measurement method may be triggered when a specific event occurs.

In this case, the specific event may be defined similarly to intra/inter system measurement events of the LTE system.

<Intra System Measurement Reporting Events>
Event A1: serving cell becomes better than a threshold
Event A2: serving cell becomes worse than a threshold
Event A3: neighbor cell becomes better than the serving cell by an offset
Event A4: neighbor cell becomes better than a threshold
Event A5: serving cell becomes worse than threshold 1 while neighbor cell becomes better than threshold 2
<Inter System Measurement Reporting Events>
Event B1: inter-system neighboring cell becomes better than a threshold
Event B2: serving cell becomes worse than threshold 1 while inter-system neighbor cell becomes better than threshold 2

For example, similarly to Event A3 of the LTE system, the specific event may be triggered when a second RRM measurement value for a specific NR BS (or cell) is greater than a second RRM measurement value for a UE's data-serving NR BS by a predetermined offset.

Since each of the examples of the proposed methods can be considered as one method for implementing the present disclosure, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from a BS to a UE through a predefined signal (e.g., physical layer signal, higher layer signal, etc.).

4. Device Configuration

Figure 14:
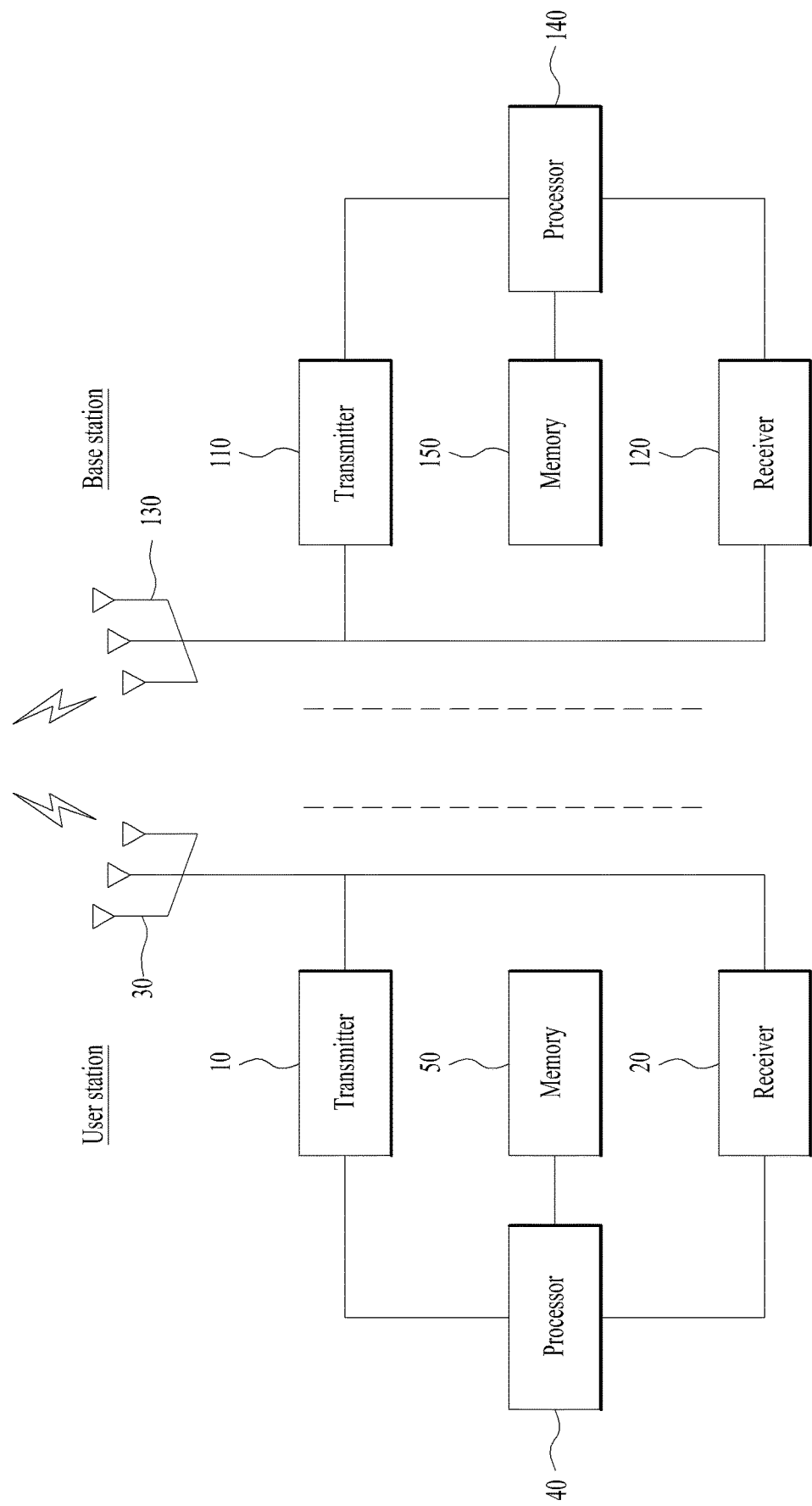
FIG. 14 is a diagram illustrating configurations of a terminal and a base station for implementing the proposed embodiments.

FIG. 14 illustrates configurations of a UE and a BS for implementing the proposed embodiments. The UE and BS illustrated in FIG. 14 operate to implement the embodiments of the RRM measurement method for a UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 may calculate an RRM measurement value using Beam Reference Signal (BRS) resources according to at least one of a first RRM measurement method for measuring a channel state per analog beam and a second RRM measurement method for measuring an average channel state for multiple analog beams. Thereafter, when reporting of the RRM measurement value calculated according to the at least one of the first and second RRM measurement methods is triggered, the UE 1 may report the RRM measurement value calculated according to a triggered RRM measurement method to a corresponding BS (e.g., LTE BS, NR BS, etc.).

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of performing Radio Resource Management (RRM) measurement by a user equipment in a wireless communication system using multiple analog beams, the method comprising:
    calculating an RRM measurement value using Beam Reference Signal (BRS) resources according to at least one of a first RRM measurement method for measuring a channel state per analog beam and a second RRM measurement method for measuring an average channel state for multiple analog beams; and
    when reporting of the RRM measurement value calculated according to the at least one of the first and second RRM measurement methods is triggered, reporting the RRM measurement value calculated according to a triggered RRM measurement method.

2. The method of claim 1, wherein calculating the RRM measurement value according to the first RRM measurement method comprises measuring a channel state per analog beam applied to each base station during a specific time period.

3. The method of claim 2, wherein when control information indicating the reporting of the RRM measurement value calculated according to the first RRM measurement method is received from a network, the user equipment reports the RRM measurement value calculated according to the first RRM measurement method using a transmission time and a transmission resource indicated by the control information to at least one base station through Layer 1 signaling or Layer 2 signaling.

4. The method of claim 3, wherein the at least one base station includes at least one of:
    a base station establishing a Radio Resource Control (RRC) connection with the user equipment;
    a base station transmitting downlink control information or system information to the user equipment;
    a base station transmitting the control information indicating the reporting of the RRM measurement value calculated according to the first RRM measurement method; and
    a base station indicated by the control information.

5. The method of claim 1, wherein calculating the RRM measurement value according to the second RRM measurement method comprises measuring an average channel state for at least one analog beam applied to a specific base station at every multiple measurement times.

6. The method of claim 5, wherein measuring the average channel state for the at least one analog beam applied to the specific base station at every multiple measurement times comprises:
    determining a maximum value among received power values on BRS resources for the at least one analog beam applied to the specific base station at each measurement time; and
    calculating an average value of maximum values per measurement time.

7. The method of claim 5, wherein measuring the average channel state for the at least one analog beam applied to the specific base station at every multiple measurement times comprises:
    determining a maximum value among received power values on BRS resources for at least one analog beam per antenna port of a BRS for the specific base station at each measurement time; and
    calculating an average value of maximum values per measurement time per antenna port of the BRS.

8. The method of claim 5, wherein measuring the average channel state for the at least one analog beam applied to the specific base station at every multiple measurement times comprises determining an average value of RRM measurement values calculated during a predetermined time period according to the first RRM measurement method as the RRM measurement value calculated according to the second RRM measurement method.

9. The method of claim 5, further comprising that when control information indicating the reporting of the RRM measurement value calculated according to the second RRM measurement method is received from a network, the user equipment reports the RRM measurement value calculated according to the second RRM measurement method using a transmission time and a transmission resource indicated by the control information to at least one base station through Layer 3 signaling.

10. The method of claim 9, wherein the at least one base station includes at least one of:
    a base station establishing a Radio Resource Control (RRC) connection with the user equipment; and
    a base station supporting communication with a Mobility Management Entity (MME).

11. The method of claim 1, wherein when the user equipment establishes Radio Resource Control (RRC) connections or Dual Connectivity with a Long-Term Evolution (LTE) base station and a New RAT (NR) base station,
    wherein the RRM measurement value calculated using the BRS resources according to the first RRM measurement method is transmitted to the NR base station through Layer 1 signaling or Layer 2 signaling, and
    wherein the RRM measurement value calculated using the BRS resources according to the second measurement method is transmitted to the LTE base station.

12. The method of claim 1, wherein the reporting of the RRM measurement value calculated according to the second RRM measurement method is triggered when a specific event occurs.

13. A user equipment for performing Radio Resource Management (RRM) measurement in a wireless communication system using multiple analog beams, the user equipment comprising:
    a transmitter;
    a receiver; and
    a processor connected to the transmitter and the receiver, wherein the processor is configured to:
calculate an RRM measurement value using Beam Reference Signal (BRS) resources according to at least one of a first RRM measurement method for measuring a channel state per analog beam and a second RRM measurement method for measuring an average channel state for multiple analog beams; and
when reporting of the RRM measurement value calculated according to the at least one of the first and second RRM measurement methods is triggered, report the RRM measurement value calculated according to a triggered RRM measurement method.

14. The user equipment of claim 13, wherein calculating the RRM measurement value according to the first RRM measurement method comprises measuring a channel state per analog beam applied to each base station during a specific time period.

15. The user equipment of claim 14, wherein when the processor receives control information indicating the reporting of the RRM measurement value calculated according to the first RRM measurement method from a network, the processor is configured to report the RRM measurement value calculated according to the first RRM measurement method using a transmission time and a transmission resource indicated by the control information to at least one base station through Layer 1 signaling or Layer 2 signaling.

16. The user equipment of claim 13, wherein calculating the RRM measurement value according to the second RRM measurement method comprises measuring an average channel state for at least one analog beam applied to a specific base station at every multiple measurement times.

17. The user equipment of claim 16, wherein measuring, by the processor, the average channel state for the at least one analog beam applied to the specific base station at every multiple measurement times comprises:
determining a maximum value among received power values on BRS resources for the at least one analog beam applied to the specific base station at each measurement time; and
calculating an average value of maximum values at the individual measurement times.

18. The user equipment of claim 16, wherein measuring, by the processor, the average channel state for the at least one analog beam applied to the specific base station at every multiple measurement times comprises:
determining a maximum value among received power values on BRS resources for at least one analog beam per antenna port of a BRS for the specific base station at each measurement time; and
calculating an average value of maximum values per measurement time per antenna port of the BRS.

19. The user equipment of claim 16, wherein measuring, by the processor, the average channel state for the at least one analog beam applied to the specific base station at every multiple measurement times comprises determining an average value of RRM measurement values calculated during a predetermined time period according to the first RRM measurement method as the RRM measurement value calculated according to the second RRM measurement method.

20. The user equipment of claim 13, wherein when the user equipment establishes Radio Resource Control (RRC) connections or Dual Connectivity with a Long-Term Evolution (LTE) base station and a New RAT (NR) base station, the processor is configured to:
transmit the RRM measurement value calculated using the BRS resources according to the first RRM measurement method to the NR base station through Layer 1 signaling or Layer 2 signaling; and
transmit the RRM measurement value calculated using the BRS resources according to the second measurement method to the LTE base station.

* * * * *